US008298652B2

(12) United States Patent
Aoki

(10) Patent No.: US 8,298,652 B2
(45) Date of Patent: Oct. 30, 2012

(54) INJECTION MOLDING DIE FOR PRODUCING MOLDED PRODUCT HAVING APPEARANCE SURFACE, INJECTION MOLDING METHOD FOR PRODUCING MOLDED PRODUCT HAVING APPEARANCE SURFACE, AND RESIN MOLDED PRODUCT MOLDED BY THE INJECTION MOLDING METHOD

(75) Inventor: Hideyuki Aoki, Nanto (JP)

(73) Assignee: SANKO GOSEI Kabushiki Kaisha, Toyamaken (JP)

( * ) Notice: Subject to any disclaimer, the term of this patent is extended or adjusted under 35 U.S.C. 154(b) by 792 days.

(21) Appl. No.: 12/327,126

(22) Filed: Dec. 3, 2008

(65) Prior Publication Data
US 2009/0148672 A1    Jun. 11, 2009

(30) Foreign Application Priority Data
Dec. 5, 2007   (JP) .................................. 2007-314113

(51) Int. Cl.
*B32B 1/00*     (2006.01)
*B32B 3/00*     (2006.01)
*B32B 3/10*     (2006.01)

(52) U.S. Cl. ............................ 428/174; 428/131; 428/187
(58) Field of Classification Search .................. 428/174, 428/187, 131; 220/4.02; 264/328.1, 328.12, 264/328.13, 328.14, 328.16
See application file for complete search history.

(56) References Cited

U.S. PATENT DOCUMENTS

| 4,439,492 A * | 3/1984 | Wada et al. .................... 428/409 |
| 2001/0025852 A1* | 10/2001 | Hirota ........................... 220/4.02 |
| 2003/0175379 A1* | 9/2003 | Sudo et al. ..................... 425/542 |

* cited by examiner

*Primary Examiner* — Catherine A Simone
(74) *Attorney, Agent, or Firm* — Sughrue Mion, PLLC

(57) ABSTRACT

An injection molding die for producing a molded product having an appearance surface, an injection molding method for producing a molded product having an appearance surface, and a resin molded product molded by the injection molding method which is free from occurrence of appearance deficiency such as a flow mark or the like that is a drawback in appearance. A molten thermoplastic resin material is injected into a cavity defined by a molded product's appearance surface forming portion (4a) and a molded product's rear surface forming portion (6a) through one or more direct gates and one or more hot runners to fill the cavity with the molten resin material, thereby performing injection molding.

5 Claims, 6 Drawing Sheets

INJECTION MOLDING DIE FOR PRODUCING MOLDED PRODUCT HAVING APPEARANCE SURFACE, INJECTION MOLDING METHOD FOR PRODUCING MOLDED PRODUCT HAVING APPEARANCE SURFACE, AND RESIN MOLDED PRODUCT MOLDED BY THE INJECTION MOLDING METHOD

TECHNICAL FIELD

The present invention relates to an injection molding die suitable for producing a resin molded product having an appearance surface, i.e., a visually exposed surface. In particular, it relates to an injection molding die for producing a molded product having an appearance surface and an injection molding method for producing a molded product having an appearance surface which are suitable for producing a large-sized molded product, a thin-walled molded product or the like having an appearance surface with no gate marks or the like left thereon and thus having good appearance, and a resin molded product molded by the injection molding method.

BACKGROUND ART

In general, a part made of a resin such as a front ornamental panel of a large-sized television, an interior part of an automobile (for example, an audio panel or a door inner panel) or the like has a lustrous appearance surface as typified by a piano black lustrous appearance surface, and a resin is molded by injection molding into a highly lustrous appearance panel which is planar or substantially planar and which has a predetermined length and/or width.

Heretofore, such a highly lustrous appearance panel has been produced by injection molding by means of, for example, an injection molding die 101 as shown in FIG. 4.

In the injection molding die 101 shown in FIG. 4, a winkle gate 104 as a cold gate is provided at a tip of runners 102b which are in communication with a sprue 102a and which extend (in an interface) between a movable die member 103 and a fixed die member 106. As shown in FIG. 5, a plurality of the runners 102b are ramified from a runner branching point 102c, and the winkle gates 104 are provided at tips of the respective runners 102b.

As shown also in FIG. 6, each of the winkle gates 104 is placed on a side of (proximate to) a rear surface 108b opposite to an appearance surface 108a of an ornamental panel 108 to be molded in a cavity 107 between the movable die member 103 and the fixed die member 106, a resin material is injected in a direction from the rear surface 108b toward the appearance surface 108a, i.e., the resin material is injected from the winkle gate 104 toward a molding surface of the fixed die member 106.

In the conventional injection molding die 101 shown in FIGS. 4 to 6, there is a problem that since volumes of the sprue 102a and the runners 102b are large, cost of their material is high. In addition, there are problems that appearance deficiency such as a flow mark is likely to be caused on the appearance surface 108a due to powdery resin which remained in the winkle gates 104, and that pressure loss is caused due to viscosity resistance when the molten resin is passed through the runners 102b and the winkle gates 104, and flow impediment is caused due to the pressure loss, and consequently, pressure distribution is non-uniform, and warp is thereby likely to occur to lead to difficulty in obtaining flatness.

In Patent Document 1, a method for molding an ornamental panel of a large-sized television which comprises injecting a resin material in a direction from an obverse surface to a reverse surface of a fitting rib to be molded in a molded product's reverse surface forming die part to permit a flow mark to occur on the reverse surface of the fitting rib or injecting a resin material from an edge of a top frame portion to be molded along a parting surface into a molding space orthogonal to a thickness direction of the ornamental panel of the large-sized television, thereby preventing a flow mark from occurring on an obverse surface of the ornamental panel of the large-sized television to enable black painting subsequent to the injection molding to be omitted.

Patent Document 1: Japanese Unexamined Patent Publication No. Hei-9 (1997) 267363

DISCLOSURE OF INVENTION

Problems to be Solved by the Invention

However, the injection molding method disclosed in Patent Document 1 comprises injecting a resin material from the edge of the top frame portion into the molding space to inhibit a flow mark from occurring on the surface of the ornamental panel. Accordingly, there is a problem that the method cannot mold a planar part such as an ornamental panel provided on a front surface of a large-sized television shown in FIG. 3 of this application as a resin molded product 2, and a shape of the molded product produced by the method is restricted to that of the molded product having the top frame portion as described in Patent Document 1.

Further, the injection molding method disclosed in Patent Document 1 injects a resin material in the direction from the appearance surface toward the rear surface of the molded product to be produced, and marks of a resin injecting port of a gate is inevitably left on the appearance surface. In this respect, the method is unsuitable as a molding method for producing a molded product having an appearance surface.

The present invention has been made in view of the above-described problems inherent in the conventional techniques. It is, therefore, an object of the present invention to provide an injection molding die for producing a molded product having an appearance surface and an injection molding method for producing a molded product having an appearance surface which are capable of obtaining flatness of the molded product with ease and which are capable of rendering pressure distribution uniform to prevent warp from occurring and which permit the molded product to be free from burr and to be free from appearance deficiency such as occurrence of a weld mark, a flow mark or the like, and to provide a resin molded product molded by the injection molding method.

Means to Solve the Problems

Accordingly, the present invention provides an injection molding die for molding a resin molded product having an appearance surface, the injection molding die comprising:

a movable die member provided with a molded product's appearance surface forming portion; and a fixed die member provided with a molded product's rear surface forming portion, the fixed die member being provided with one or more hot runners to provide one or more resin supplying paths, the fixed die member being provided with one or more gates from which a molten resin is injected into a cavity defined by the molded product's appearance surface forming portion and the molded product's rear surface forming portion;

the one or more gates being one or more direct valve gates directly opening from the fixed die member to the cavity and opened/closed by a valve, the one or more direct valve gates being disposed in the molded product's rear surface forming portion; and the movable die member or each of the movable die member and the fixed die member being integrally provided with a protrusion so as to use no insert.

Further, the present invention provides an injection molding method for producing a molded product having an appearance surface, the injection molding method using the injection molding die for producing a molded product having an appearance surface according to claim 1, the injection molding method comprising steps of:

heating vicinity of the molded product's appearance surface forming portion of the die to a temperature higher by 10° to 100° than a deflection temperature under load of a resin to be used;

injecting a molten resin into the die;

cooling the vicinity of the molded product's appearance surface forming portion of the die to a temperature lower by 0° to 100° than a deflection temperature under load of the resin used to bring the resulting resin molded product into such a condition that the resin molded product can be removed from the die.

It is preferred to heat the vicinity of the molded product's appearance surface forming portion of the die to a temperature higher by 20° to 100° than a deflection temperature under load of the resin used, before the injection. It is also preferred to cool the vicinity of the molded product's appearance surface forming portion of the die to a temperature lower by 20° to 100° than a deflection temperature under load of the resin used, after the injection.

Moreover, the present invention provides a resin molded product having a good appearance surface, the resin molded product being produced by the injection molding method for producing a molded product having an appearance surface, the injection molding method using the injection molding die for producing a molded product having an appearance surface according to claim 1, the injection molding method comprising steps of:

heating vicinity of the molded product's appearance surface forming portion of the die to a temperature higher by 10° to 100° than a deflection temperature under load of a resin to be used;

injecting a molten resin into the die;

cooling the vicinity of the molded product's appearance surface forming portion of the die to a temperature lower by 0☐ to 100☐ than a deflection temperature under load of the resin used to bring the resulting resin molded product into such a condition that the resin molded product can be removed from the die.

The appearance surface may be a highly lustrous surface. The resin molded product of the present invention may be planar or substantially planar and has a predetermined length and/or a predetermined width, in particular, it may be a front ornamental panel of a large-sized television.

[Function]

According to the injection molding method of the present invention for producing a molded product having an appearance surface which is performed using the injection molding die of the present invention, vicinity of the molded product's appearance surface forming portion of the die is preliminarily heated to a temperature higher by 10° to 100°, preferably by 20° to 100°, than a deflection temperature under load of a resin to be used, and the resin is injected from the molded product's rear surface forming portion provided in the fixed die member through the one or more direct valve gates into the cavity, and then the vicinity of the molded product's appearance surface forming portion of the die is cooled to a temperature lower by 0° to 100°, preferably by 20° to 100°, than a deflection temperature under load of the resin used to bring the resulting resin molded product into such a condition that the resin molded product can be removed from the die. Accordingly, the resin is unlikely to undergo molecular orientation, and thus residual stress in the molded product is reduced. The molded product is thereby obtained of which the appearance surface is free from appearance deficiency such as a flow mark, a weld line or the like, and which is less susceptible to deformation or formation of a sink mark, and in which a mirror-like smooth surface of the molded product's appearance surface forming portion is well transferred to the appearance surface of the molded product.

According to the injection molding die of the present invention for producing a molded product having an appearance surface and the injection molding method of the present invention for producing a molded product having an appearance surface, flatness of a molded product can be obtained with ease, and warp of the molded product is prevented by rendering pressure distribution uniform, and the molded product obtained is free from burr. The resin molded product molded by the injection molding method of the present invention is free from a weld mark, a flow mark or the like which is drawback in appearance.

NOTE ON REFERENCE NUMBERS

Figure 1:
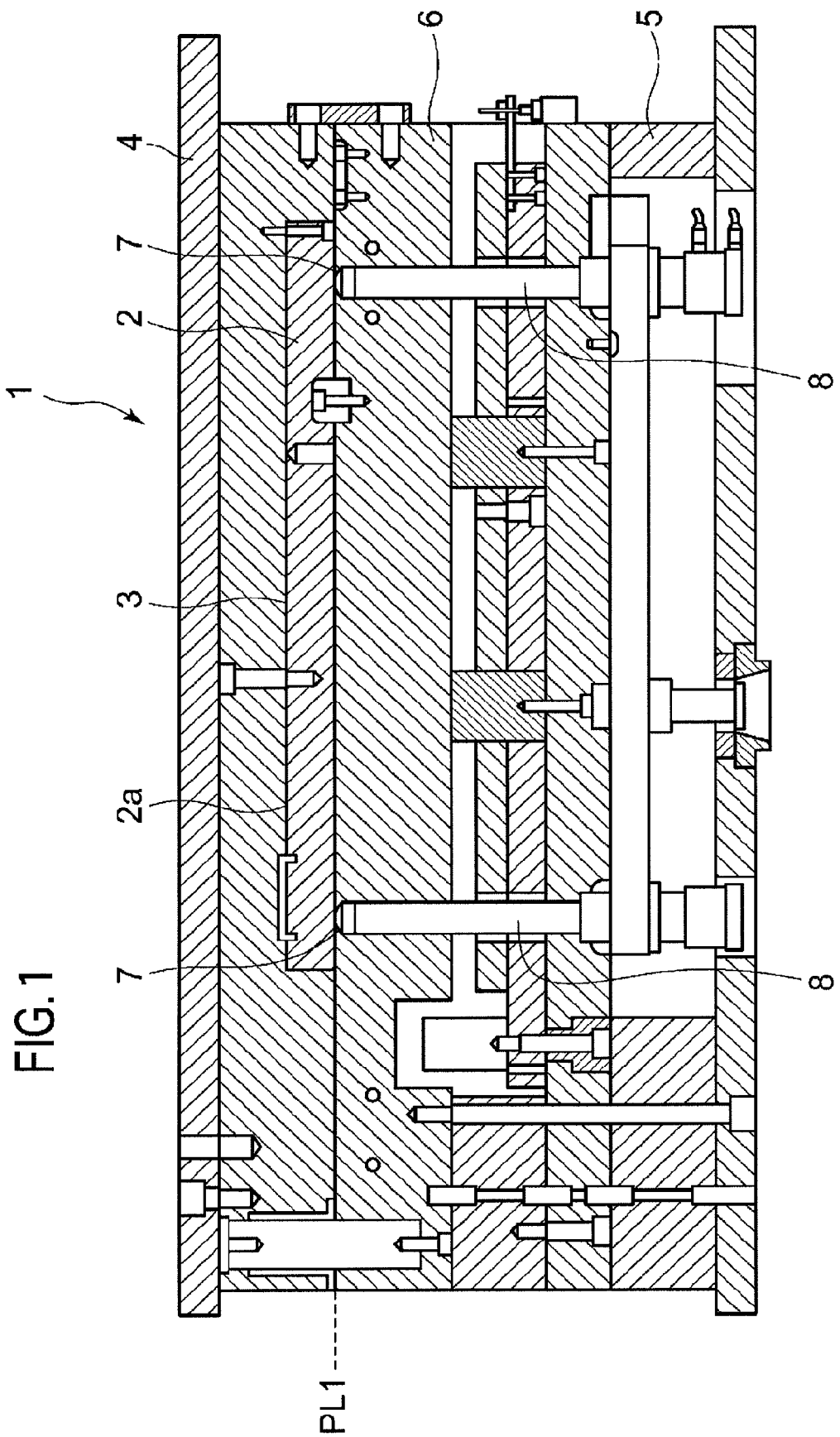
FIG. 1 is a sectional view of the injection molding die of the embodiment of the present invention.

1: injection molding die
2: molded product
2a: appearance surface
3: cavity
4: movable die member
4a: molded product's appearance surface forming portion
5: plate
6: fixed die member
6a: molded product's rear surface forming portion
7: direct gate
8: hot runner
10a: protrusion
10b: protrusion
101: injection molding die
102a: sprue
102b: runner
102c: runner branching point
103: movable die member
104: winkle gate
106: fixed die member
107: cavity 108a: appearance surface
108b: rear surface

BEST MODE FOR CARRYING OUT THE INVENTION

In the following, best mode for carrying out the present invention will be described with reference to the accompanying drawings.

Figure 2:
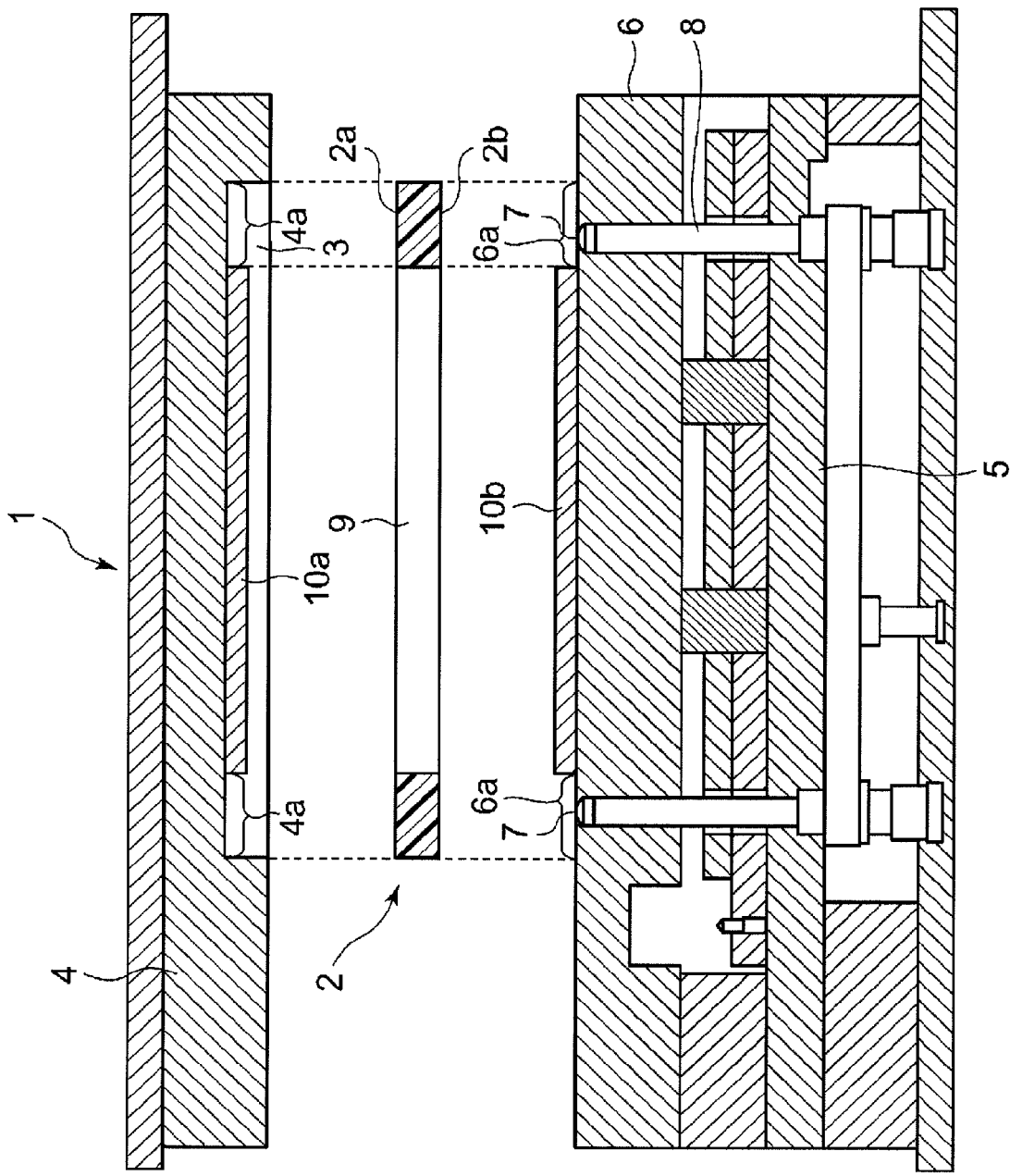
FIG. 2 is a partially exploded sectional view of the same injection molding die of the embodiment of the present invention.

FIGS. 1 and 2 are sectional views when die members of an injection molding die for producing a molded product having an appearance surface according to the present invention are clamped together and when the die members of the injection molding die for producing a molded product having an appearance surface according to the present invention are separated from each other, respectively.

The injection molding die 1 shown in FIGS. 1 and 2 comprises a movable die member 4 for molding an appearance surface 2a of a molded product 2, for example, an ornamental panel provided on a front surface of a large-sized television, and a fixed die member 6 for molding a rear surface 2b of the molded product 2.

As shown in FIGS. 1 and 2, the injection molding die 1 is provided with direct gates 7 in the fixed die member 6, and each of the direct gates 7 is connected to a hot runner 8, the direct gates 7 and the hot runners 8 constitute resin flow paths to a cavity 3.

Accordingly, molten resin is injected from each of the direct gates 7 in a direction from the rear surface 2b of a frame portion surrounding an opening 9 of the molded product 2 to the front appearance surface 2a, i.e., the molten resin is injected toward the movable die portion 4 into the cavity 3.

The movable die member 4 is provided with a molded product's appearance surface forming portion 4a for forming the appearance surface 2a of the molded product 2, and the movable die member 4 is further provided integrally with a protrusion 10a for forming the opening 9 of the molded product 2 so as to use no insert. The fixed die member is provided with a molded product's rear surface forming portion 6a for forming the rear surface 2b of the molded product 2, and the fixed die member 6 may further be provided integrally with a protrusion 10b for forming the opening 9 of the molded product 2 so as to use no insert. Occurrence of marks of an insert is thereby prevented which would occur on the appearance surface 2a of the molded product 2 if the insert were used instead of the protrusion 10a or the protrusions 10a and 10b.

According to the injection molding die 1 of the embodiment of the present invention, a molten thermoplastic resin material is injected from the direct gates 7 provided in the fixed die member 6 into the cavity 3 defined by the molded product's appearance surface forming portion 4a and the molded product's rear surface forming portion 6a to fill the cavity 3 with the molten thermoplastic resin material, thereby effecting injection molding.

Then, the injection molding method of the present invention will be described which is performed using the injection molding die 1 of the above-described embodiment of the present invention.

In the injection molding method of the present invention which uses the injection molding die 1 of the embodiment of the present invention, vicinity of the molded product's appearance surface forming portion of the die is heated by heating equipment (not shown) to a temperature higher by 10° to 100°, preferably by 20° to 100°, than a deflection temperature under load of a resin used. Subsequently, the molten resin is injected from the direct gates 7 into the cavity 3 to fill the cavity 3 with the molten resin.

Thereafter, the vicinity of the molded product's appearance surface forming portion of the injection molding die 1 is cooled by cooling equipment (not shown) to a temperature lower by 0° to 100°, preferably 20° to 100°, than a deflection temperature under load of a resin used, and the resin material is thereby solidified to obtain a molded product 2.

According to the above-described injection molding method of the present invention, the resin filled into the cavity 3 is unlikely to undergo molecular orientation, and thus residual stress in the molded product 2 is reduced. The molded product 2 is thereby obtained of which the appearance surface 2a is free from appearance deficiency such as a flow mark, a weld line or the like, and which is less susceptible to deformation or formation of a sink mark, and in which a mirror-like smooth surface of the appearance surface forming portion 4a for firming the appearance surface 2a of the molded product 2 is well transferred to the appearance surface 2a.

Figure 3:
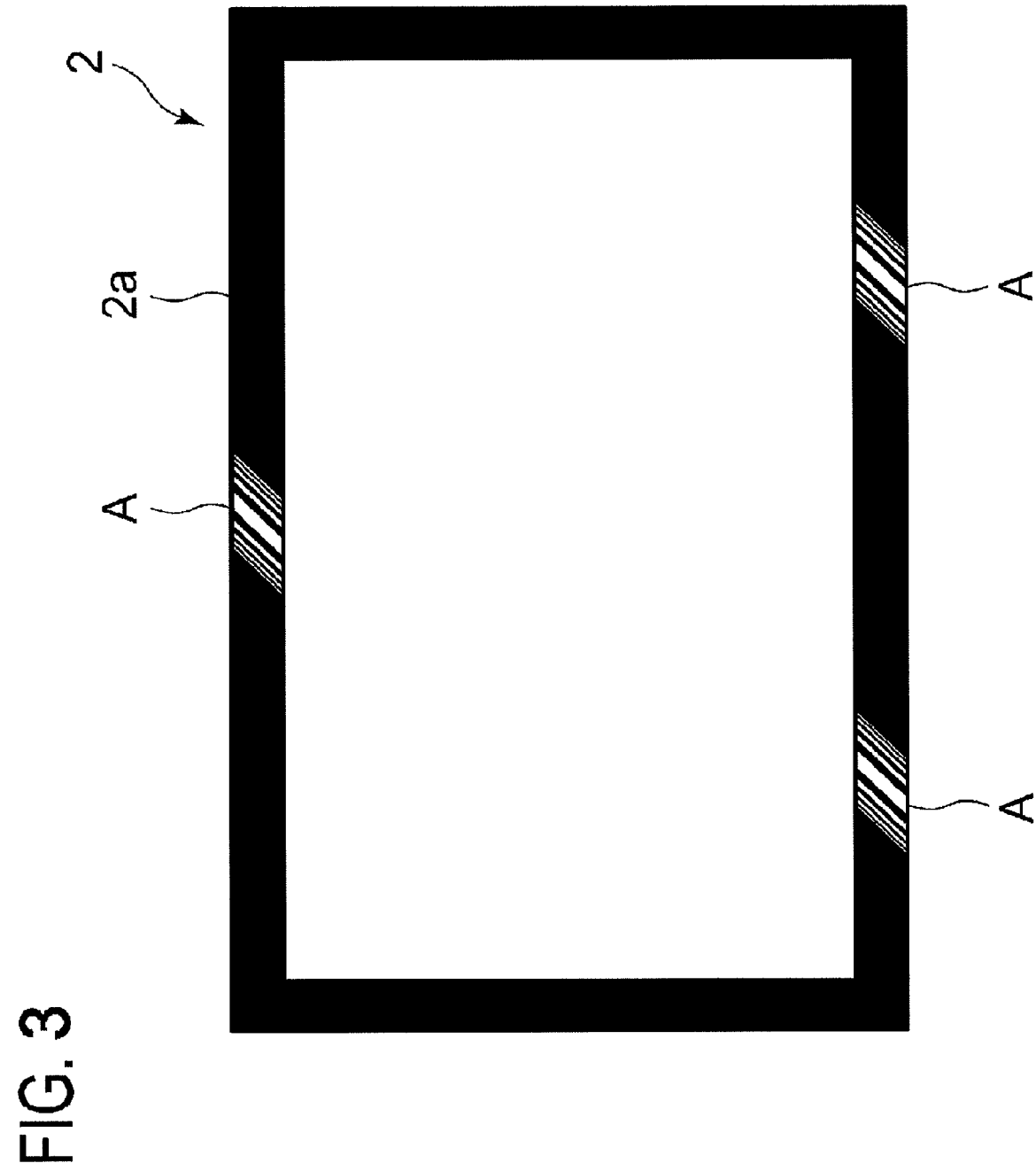
FIG. 3 is a plan view of the resin molded product of the embodiment of the present invention.
Figure 4:
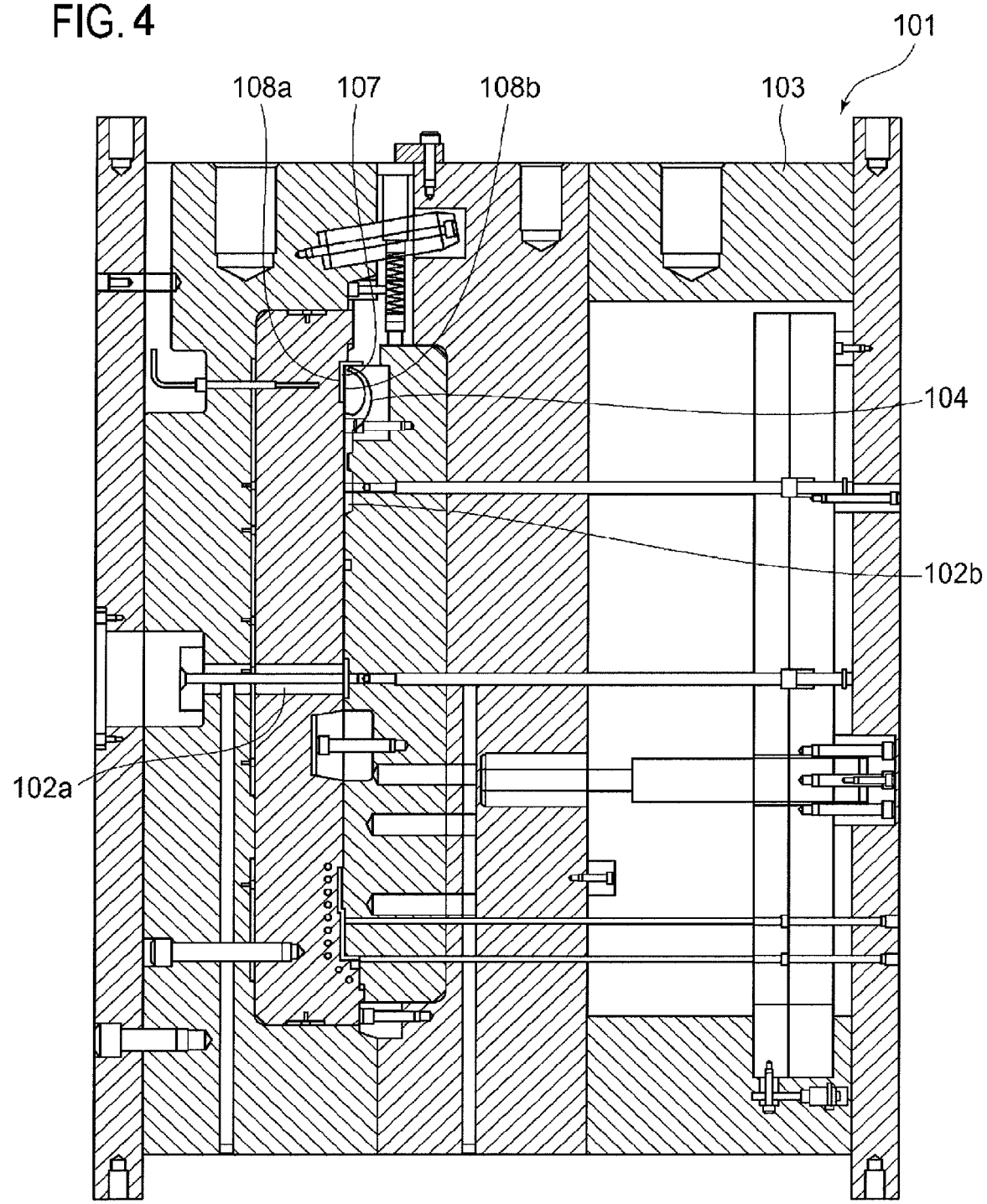
FIG. 4 is a sectional view of a conventional injection molding die.
Figure 5:
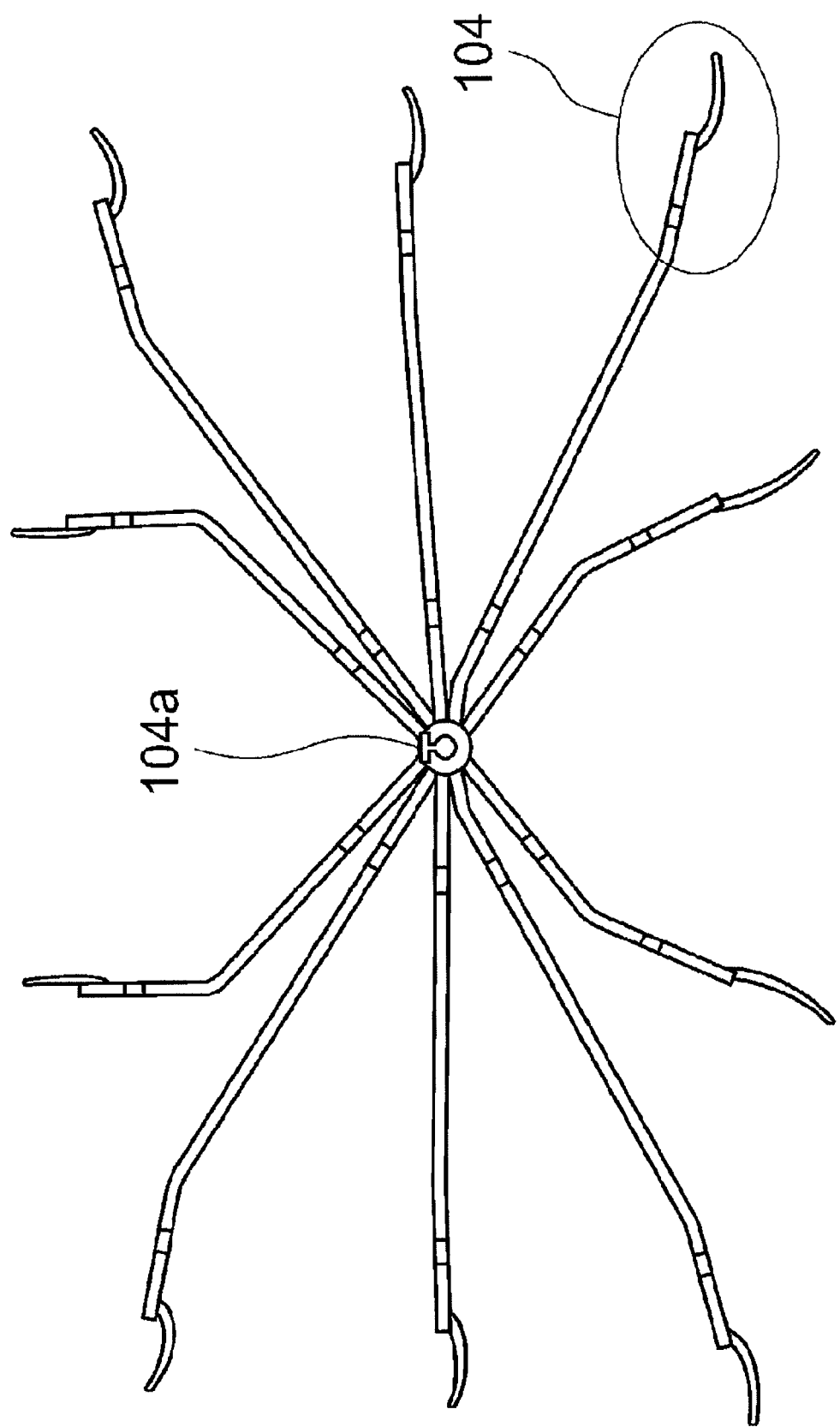
FIG. 5 is a perspective view of runners and winkle gates of the conventional injection molding die.
Figure 6:
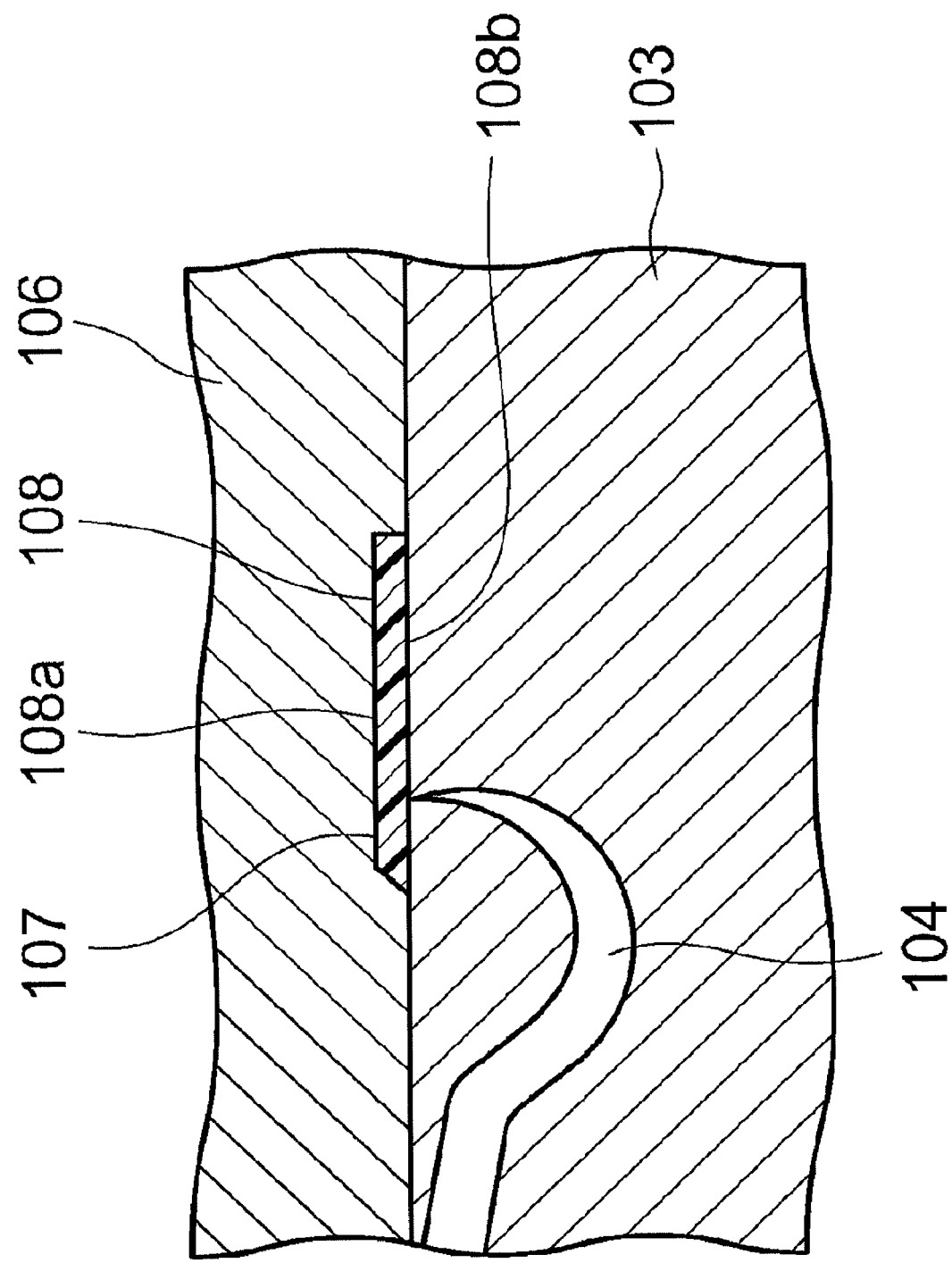
FIG. 6 is an enlarged fragmentary sectional view of the conventional injection molding die shown in FIG. 4.

FIG. 3 is a plan view of the resin molded product 2 of an embodiment of the present invention obtained by carrying out the injection molding method of the present invention performed using the injection molding die 1 of the embodiment of the present invention. The resin molded product 2 is an ornamental panel provided on a front surface of a large-sized television as an example of a highly lustrous appearance surface panel. As shown in FIG. 3, the resin molded product 2 has the appearance surface 2a to which the mirror-like finished smooth mold surface of the molded product's appearance surface forming portion 4a is transferred, and the appearance surface 2a is lustrous as shown by A in FIG. 3.

This application is based on Japanese Patent Application No. 2007-314113 filed Dec. 5, 2007, incorporated herein by reference in its entirety.

The invention claimed is:

1. A resin molded large-sized product having an opening and an appearance surface, the resin molded product being produced by an injection molding method using an injection molding die, the injection molding die comprising:

a movable die member provided with a molded product's appearance surface forming portion; and a fixed die member provided with a molded product's rear surface forming portion, the fixed die member being provided with two or more hot runners to provide two or more resin supplying paths, the fixed die member being provided with two or more gates each connected to a hot runner from which a molten resin is injected into a cavity defined by the molded product's appearance surface forming portion and the molded product's rear surface forming portion;

the two or more gates being one or more direct valve gates directly opening from the fixed die member to the cavity and opened/closed by a valve, the two or more direct valve gates being disposed in the molded product's rear surface forming portion; and the movable die member or each of the movable die member and the fixed die member being integrally provided with a protrusion for making said opening so as to use no insert, the injection molding method comprising steps of:

heating a vicinity of the molded product's appearance surface forming portion of the die to a temperature higher by 10° C. to 100° C. than a deflection temperature under load of a resin to be used;

injecting a molten resin from the two or more gates each connected to a hot runner into the die integrally provided with a protrusion which makes said opening and without using an insert; and cooling the vicinity of the molded product's appearance surface forming portion of the die to a temperature lower by 0° C. to 100° C. than a deflection temperature under load of the resin used to bring the resulting resin molded product into such a condition that the resin molded product can be removed from the die, wherein the appearance surface of the molded product thus produced is lustrous and has a mirror-like smooth surface that has been transferred from the molded product's appearance surface forming portion.

2. The resin molded product according to claim 1, which is planar or substantially planar and has a predetermined length and/or a predetermined width.

3. The resin molded product according to claim 1, which is a front ornamental panel of a large-sized television.

4. The resin molded product according to claim 1, wherein each of movable die member and the fixed die member is integrally provided with a protrusion.

5. An injection molding method for producing a resin molded large-sized product having an opening and an appearance surface, the resin-molded product being produced by an injection molding method using an injection molding die, the injection molding die comprising:

a movable die member provided with a molded product's appearance surface forming portion; and a fixed die member provided with a molded product's rear surface forming portion, the fixed die member being provided with two or more hot runners to provide two or more resin supplying paths, the fixed die member being provided with two or more gates each connected to a hot runner from which a molten resin is injected into a cavity defined by the molded product's appearance surface forming portion and the molded product's rear surface forming portion;

the two or more gates being one or more direct valve gates directly opening from the fixed die member to the cavity and opened/closed by a valve, the two or more direct valve gates being disposed in the molded product's rear surface forming portion; and the movable die member or each of the movable die member and the fixed die member being integrally provided with a protrusion for making said opening so as to use no insert, the injection molding method comprising steps of:

heating a vicinity of the molded product's appearance surface forming portion of the die to a temperature higher by 10° C. to 100° C. than a deflection temperature under load of a resin to be used;

injecting a molten resin from the two or more gates each connected to a hot runner into the die integrally provided with a protrusion which makes said opening and without using an insert; and cooling the vicinity of the molded product's appearance surface forming portion of the die to a temperature lower by 0° C. to 100° C. than a deflection temperature under load of the resin used to bring the resulting resin molded product into such a condition that the resin molded product can be removed from the die, wherein the appearance surface of the molded product thus produced is lustrous and has a mirror-like smooth surface that has been transferred from the molded product's appearance surface forming portion.

* * * * *